United States Patent [19]

Yokoyama

[11] Patent Number: 5,572,258
[45] Date of Patent: Nov. 5, 1996

[54] MOTION COMPENSATION ESTIMATING DEVICE AND METHOD ACHIEVING IMPROVED MOTION COMPENSATION

[75] Inventor: Yutaka Yokoyama, Tokyo, Japan

[73] Assignee: NEC Corporation, Tokyo, Japan

[21] Appl. No.: 309,083

[22] Filed: Sep. 20, 1994

[30] Foreign Application Priority Data

Sep. 28, 1993 [JP] Japan .................... 5-240983

[51] Int. Cl.⁶ .................................. H04N 7/36
[52] U.S. Cl. ................................ 348/415; 348/420
[58] Field of Search ....................... 348/402, 413,
348/416, 420, 699, 700, 701; 382/107,
173, 236

[56] References Cited

U.S. PATENT DOCUMENTS 4,779,131 10/1988 Matsumoto et al. ................ 348/699
5,177,608 1/1993 Ohki et al. ......................... 348/416

OTHER PUBLICATIONS

Michael Hotter et al, "Image Segmentation Based on Object Oriented Mapping Parameter Estimation", *Signal Processing*, vol. 15, No. 3, 1988, pp. 315–334.

"A Study on Motion Compensation Based on Segmentation by Isodensity Areas", *The Proceedings Of The 1993 National Convention Of IECE (Japan)*, D–292, pp. 7–53.

Primary Examiner—Tommy P. Chin
Assistant Examiner—A. Au
Attorney, Agent, or Firm—Sughrue, Mion, Zinn, Macpeak & Seas

[57] ABSTRACT

An area subdividing unit subdivides a reference image, producing sub-areas. An inter-frame difference calculating device determines inter-frame differences between the reference image and an input image. A moving area detecting unit designates, by reference to the inter-frame differences, moving areas from a plurality of sub-areas. An area integrating device integrates the detected moving areas according to information of the reference image to create a plurality of moving object areas. A motion estimating device estimates motion between the input and reference images for each moving object area to attain motion parameters. A motion compensating unit compensates motion for each moving object area based on the motion parameters to generate a motion compensated prediction image. A motion compensating apparatus is capable of achieving complete and exact motion compensation using area information and a reduced number of encoding operations.

12 Claims, 3 Drawing Sheets

MOTION COMPENSATION ESTIMATING DEVICE AND METHOD ACHIEVING IMPROVED MOTION COMPENSATION

BACKGROUND OF THE INVENTION

The present invention relates to a method of and an apparatus for motion compensated inter-frame prediction, for example, a method of and an apparatus for motion compensated prediction in which a moving picture is encoded.

DESCRIPTION OF THE RELATED ART

In the conventional block matching method generally known as a motion compensated prediction method, an image or a picture is partitioned into rectangular blocks having a fixed size, and motion compensation is performed for each block. However, according to this method, continuity of an object represented by the image may be lost due to motion compensation processing and hence block distortion may occur in the predicted image. One example of a method to avoid such block distortion is described in pages 7 to 53 of the proceedings of the 1993 National Convention of IEICE (Japan), D-292 entitled "A Study on Motion Compensation Based on Segmentation by Isodensity Areas." Here, an image is subdivided into areas of identical density, or isodensity, to conduct motion compensation processing for each segment thus obtained. In this technique, a frame image preceding an objective frame image is first linearly quantized to gather a plurality of pixels having an identical density and which are adjacent to each other, thereby effecting initial area segmentation. Subsequently, regions having small areas are removed. Thereafter, completely included areas are integrated with each other to attain or extract isodensity areas having identical densities. Thereafter, for each extracted area of the preceding frame image, matching is carried out with respect to the objective or current frame image to obtain a translation vector and four modified vectors. This achieves motion compensation for each area.

However, according to the conventional technology of motion compensation in each area, the motion is separately predicted for the respective areas without differentiating moving and still areas. Consequently, this increases the number of operations. During area integration, regions with small areas are removed from the initial partition, and integration is performed only on completely included areas. Therefore, the integrating operation is not carried out for some adjacent areas. Consequently, there may exist a case in which a plurality of small areas obtained by subdividing an area of a single moving object are kept in the partitioned state which leads to problems. For example, the number of operations and the quantity of code are increased in relation to increases in the number of sub-areas, and influence of noise becomes greater in small subareas. As a result, the precision of motion compensated prediction deteriorates.

SUMMARY OF THE INVENTION

Therefore, it is an object of the present invention to provide a motion compensating apparatus and a motion compensating method to achieve motion compensation with a reduced number of operations and a reduced quantity of code.

To achieve the above object, in accordance with the present invention, there is provided a motion compensation apparatus for inter-frame prediction to encode a moving picture. The apparatus includes an area subdividing means for subdividing a reference image into sub-areas according to the contents of the image, an inter-frame difference calculating means for producing inter-frame difference information between an input image and a reference image, a moving area detecting means for detecting, by reference to the inter-frame difference information, those sub-areas associated with motion as moving areas, an area integrating means for integrating the moving areas on the basis of the reference image and outputting the moving areas as moving object areas, a motion estimating means for estimating inter-frame motion between the input and reference images for each of the moving object areas and outputting motion parameters representing motion of the moving object areas, and a motion compensating means for conducting motion compensation for each of the moving object areas of the reference image according to the motion parameters and producing a motion compensated prediction image for the input image.

In the apparatus, the area subdividing means preferably subdivides the reference image into areas using methods of region growing, partition, split and merge, and/or clustering.

The moving area detecting means preferably checks a plurality of sub-areas and designates as moving areas those sub-areas having large inter-frame differences.

The area integrating means preferably integrates the adjacent moving areas having similarity values, corresponding to an image characteristic, equal to or more than a predetermined value.

The motion estimating means establishes, by use of the moving object areas as templates, matching between a current frame image and the templates and thus attains motion vectors and motion parameters.

The motion compensating means initializes the motion compensation estimated image to predetermined values and thereafter sequentially overwrites the predetermined values corresponding to a displaced and transformed image of the moving object areas.

In accordance with the present invention, there is provided a motion compensation method of inter-frame prediction to encode a moving picture. The method includes the steps of subdividing a reference image into sub-areas according to the contents of the image, producing inter-frame difference information between an input image and the reference image, designating, by reference to the inter-frame difference information, those sub-areas associated with motion as moving areas, integrating the moving areas on the basis of the reference image and outputting the integrated moving areas as moving object areas, estimating inter-frame motion between the input and reference images for each of the moving object areas and outputting motion parameters representing motion of the moving object areas, and conducting motion compensation for each of the moving object areas of the reference image according to the motion parameters and producing a motion compensated prediction image for the input image.

The area subdividing step preferably subdivides the reference image into sub-areas using methods of region growing, partition, split and merge, and/or clustering.

The moving area detecting step preferably checks a plurality of sub-areas and designates as moving areas those sub-areas having large inter-frame differences.

The area integrating step preferably integrates adjacent moving areas having similarity values, corresponding to an image characteristic, equal to or more than a predetermined value.

The motion estimating step preferably establishes, by use of the moving object areas as templates, matching between a current frame image and the templates and thus attains motion vectors and motion parameters.

The motion compensating step preferably initializes the motion compensated prediction image to predetermined values and thereafter sequentially overwrites the predetermined values with values corresponding to a displaced and transformed image of the moving object areas.

Consequently, according to principal portions of the motion compensated prediction apparatus and method in accordance with the present invention, a reference image is subdivided into sub-areas based on the contents of the image to produce a sub-divided area in order to obtain differential information between frames of an input image and a reference image. Referencing inter-frame differential information, a detector designates those sub-regions associated with motion. The moving regions are integrated with each other according to the reference image to produce moving object areas. For each moving object area, there is estimated motion between frames of the input and reference images. Motion parameters representing motion of the moving object areas are created to conduct motion compensation for each of the moving object areas of the reference image.

In accordance with the present invention as described above, there are extracted areas of the image, each being associated with motion and each characterized by similar pixel values to carry out motion compensation for each of the areas. Only moving areas are extracted and integrated with each other to reduce the number of areas to be processed. Since area integration is performed only for the moving areas, area integration of still areas is avoided and satisfactory large-sized integrated areas are produced.

BRIEF DESCRIPTION OF THE DRAWINGS

The objects and features of the present invention will become more apparent from the consideration of the following detailed description in conjunction with the accompanying drawings wherein.

DESCRIPTION OF THE PREFERRED EMBODIMENTS

Referring to the accompanying drawings, description will be given of the motion compensated prediction apparatus and method in accordance with the present invention. FIGS. 1 to 3E show embodiments of the motion compensated prediction apparatus and method in accordance with the present invention.

Figure 1:
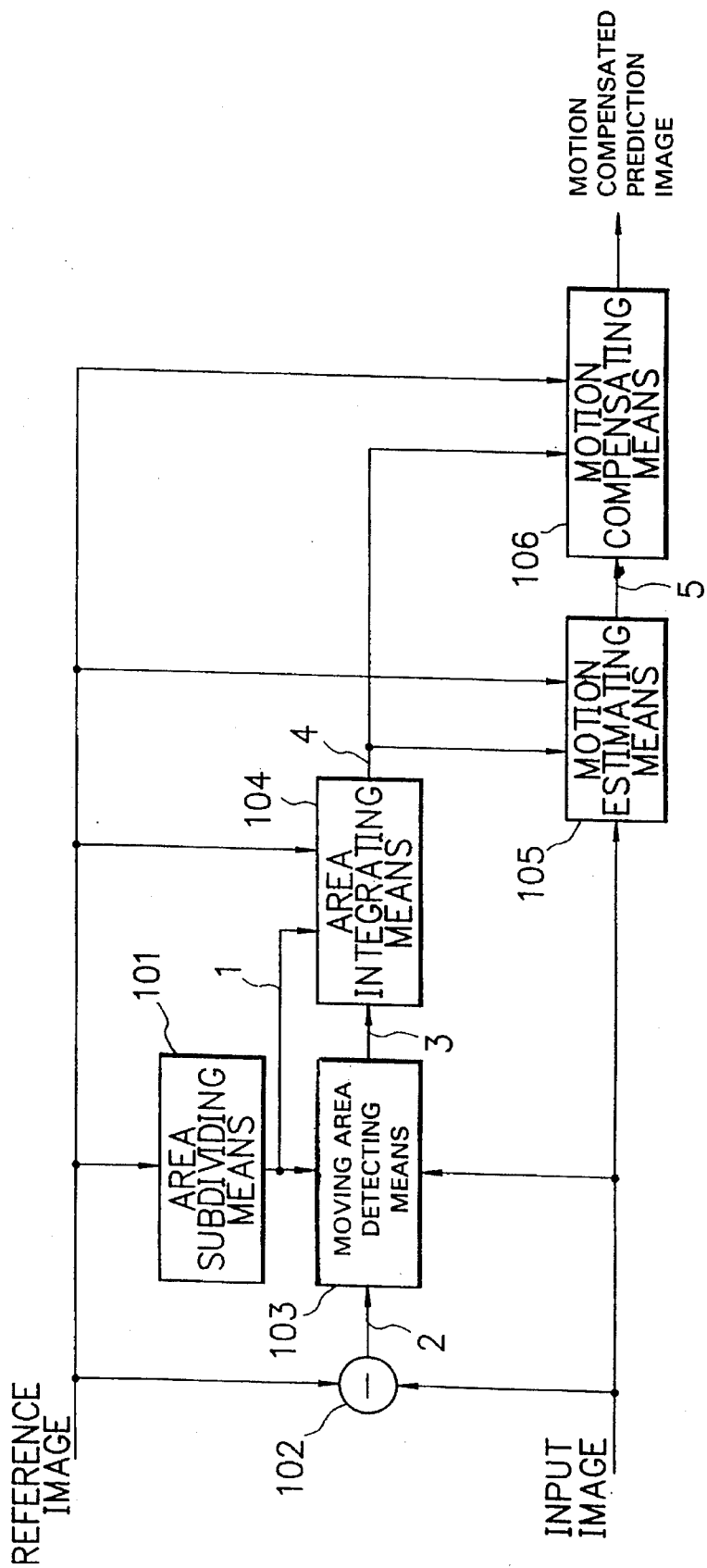
FIG. 1 is a schematic block diagram showing the configuration of an embodiment of the motion compensated prediction apparatus in accordance with the present invention.

FIG. 1 shows an embodiment of the motion compensated prediction apparatus in accordance with the present invention. This circuit structure includes area segmenting means 101 to subdivide a reference image into segments or sub-areas. An image known to an encoding side and a decoding side prior to encoding of the input image is used as the reference image. Specifically, an image obtained by encoding a frame preceding the current frame may be adopted as the reference image. Subsequently, inter-frame difference computing means 102 calculates an inter-frame difference between the reference and input images. Moving area detecting means 103 references the magnitude of the inter-frame differences to detect moving areas from the plural partitioned areas. Area integrating means 104 combines the designated moving areas on the basis of information of the reference image to extract moving object areas. Motion estimating means 105 estimates motion, for each moving object area, between the input and reference images to attain motion parameters. Motion compensating means 106 compensates motion for each moving object area according to the motion parameters to produce a motion compensated prediction image.

Description will now be given of the operation of each constituent means of the motion compensating apparatus outlined above. The area subdividing means 101 subdivides the reference image into a plurality of sub-areas to produce results of initial segmentation. An example of the area partitioning method is a commonly known region growing method. According to the region growing method, in a case where an objective pixel and the adjacent pixels have an identical feature, sequentially executed processing integrates the pixels to form an area. Areas having the same feature are gradually grown to achieve segmentation of the entire image. More specifically, the region growing method is conducted, for example, in the following manner.

a) First, the screen is scanned to search for an objective pixel to be classified for segmentation. Using the objective pixel as the starting point, a new area is grown.

b) Among a plurality of pixels adjacent to the objective pixel, some are selected to be subject to segmentation. For each such pixel, a pixel-to-pixel distance is calculated. When the distance is equal to or less than a threshold value, the pixel is integrated into an area.

c) Using the integrated pixel as the objective pixel, the processing of step b) is repeated.

d) Operations b) and c) are repeated until the area reaches an upper limit.

e) When the upper limit is reached, control is returned to step a) to search for a pixel as the starting point of a new area. When all pixels are classified as above into their respective areas, the processing is terminated.

However, the above method has an attendant problem. The problem arises when pixels having a large inter-pixel distance are considered to belong to the different areas but are integrated into an identical area when there exists a portion in which the distance between pixels is gradually changed.

To avoid excessive integration of areas in such a case, there is known a method in which a mean value of the pixels of an already integrated area is compared with the value of each adjacent pixel. This method may be applied to the case above.

As already known, the inter-pixel distance adopted in the region growing method may be defined, for example, as the difference between luminance values of the objective pixel and each adjacent pixel of the reference image. In processing of color images, a broadly employed method uses color information other than the luminance as information of color difference. For example, in a method employing luminance and color difference, assuming that the mean luminance value of an area in which the objective pixel is integrated is Y, the mean values of color differences are represented as Cr and Cb, the value of luminance of an adjacent pixel as the comparison object is Y', and the values of color differences are expressed as Cr' and Cb', the distance d between the two pixels is defined as $$d=(Y'-Y)^2 \times k1 + (Cr'-Cr)^2 \times k2 + (Cb'-Cb)^2 \times k3 \tag{1}$$

The distance may be alternatively defined as follows.

$$d=|Y'-Y| \times k1 + |Cr'-Cr| \times k2 + |Cb'-Cb| \times k3 \tag{2}$$

In the expressions, k1, k2, and k3 stand for weighting constants. According to a method using color information other than color difference information, there may be adopted values respectively related to the RGB colorimetric system, the XYZ standard colorimetric system, and the uniform chromaticity scale (USC) chart. The inter-pixel distance can be attained by calculating an expression similar to expression (1) or (2).

In the above method, however, there appears in some cases a small area containing several pixels due to noises or the like of the reference image. This results in excessive segmentation and hence area segmentation cannot be practically achieved. To overcome this drawback, there is a known post-processing for area segmentation. In the post-processing, small areas that include a number of pixels equal to or less than a threshold value are removed. This operation is applicable to the case above. To define the small area, the number of pixels contained in each subdivided area is computed. An area containing a number of pixels equal to or less than the threshold value is regarded as a small area. The detected small area is integrated into the area having the smallest inter-pixel distance. The distance is calculated from expression (1) or (2) according to the mean value of pixels in the area. The values of pixels may be represented in various ways as already described in conjunction with the region growing method.

For the area segmenting method, there may be used in addition to the region growing method, other known methods such as partition, split and merge, clustering, histogram, and adopting edge methods.

The moving area detecting means 103 detects from the plural segmented areas those areas having a large inter-frame difference. A specific example of the method has been described in pages 315 to 334 of the Signal Processing, Vol. 15, No. 3 (1988) entitled "Image segmentation based on object oriented mapping parameter estimation." In this method, an inter-frame difference signal is first obtained between an input image of the current frame and the reference image. Subsequently, the inter-frame difference signal is processed according to a threshold value to designate a pixel having a large inter-frame difference as a change pixel. Prior to the threshold processing, noise components may be removed by a mean value filter. To remove erroneously extracted pixels, the change image may be smoothed by a median filter. Next, for each area, the number of change pixels contained therein is calculated according to the results of area segmentation to attain the ratio of change pixels to non-change pixels in the area. If the ratio is equal to or more than the threshold value, the area is recognized as a moving area.

The area integrating means 104 integrates according to the reference image the moving areas resulting from the moving area detection above. For the integration method, there may be adopted, for example, a known method in which the area integration is accomplished on the basis of a characteristic similarity between segmented sub-areas. Namely, similarity is measured between adjacent areas designated as moving areas. Moving areas having a similarity value, corresponding to an image characteristic, equal to or more than a fixed value are integrated. An example of a measure of similarity is the distance calculated from expression (1) with the mean value of pixels in the area.

The value for the distance measurement may be represented in various ways as described in the explanation of the region growing method. There may also be employed a method in which similarity is examined with respect to the histogram of pixel values in the area. Therefore, the present invention is not restricted by the method described above.

The motion estimating means 105 estimates motion for each moving object area resulting from the area integration to obtain motion parameters. Various motion estimating methods are applicable. There may be used, for example, a method in which the moving object area is employed as a template to establish matching with respect to the current frame image so as to attain motion vectors. There is also a method in which an affine transform model is utilized to estimate a two-dimensional transformation and a three-dimensional motion, thereby calculating motion parameters.

An example of a method of predicting a three-dimensional motion using parameter estimation has been described in an article of the Signal Processing, Vol. 15, No. 3, pp. 315–334 (1988). In this method, to predict motion of the moving object area, there is defined an object model, a motion model, and a projection model. To configure the object model, there is introduced a planar solid body in a three-dimensional space represented by expression (3) in the three-dimensional coordinate system (x,y,z).

$$ax+by+cz=1 \tag{3}$$

Subsequently, in the motion model, the relationship between transitions of three-dimensional positions due to motion $(x,y,z) \rightarrow (x',y',z')$ is defined by an affine transform model expressed as follows.

$$\begin{pmatrix} x' \\ y' \\ z' \end{pmatrix} = \begin{pmatrix} R_{11} & R_{12} & R_{13} \\ R_{21} & R_{22} & R_{23} \\ R_{31} & R_{32} & R_{33} \end{pmatrix} \begin{pmatrix} x \\ y \\ z \end{pmatrix} + \begin{pmatrix} T_1 \\ T_2 \\ T_3 \end{pmatrix} \tag{4}$$

Figure 2:
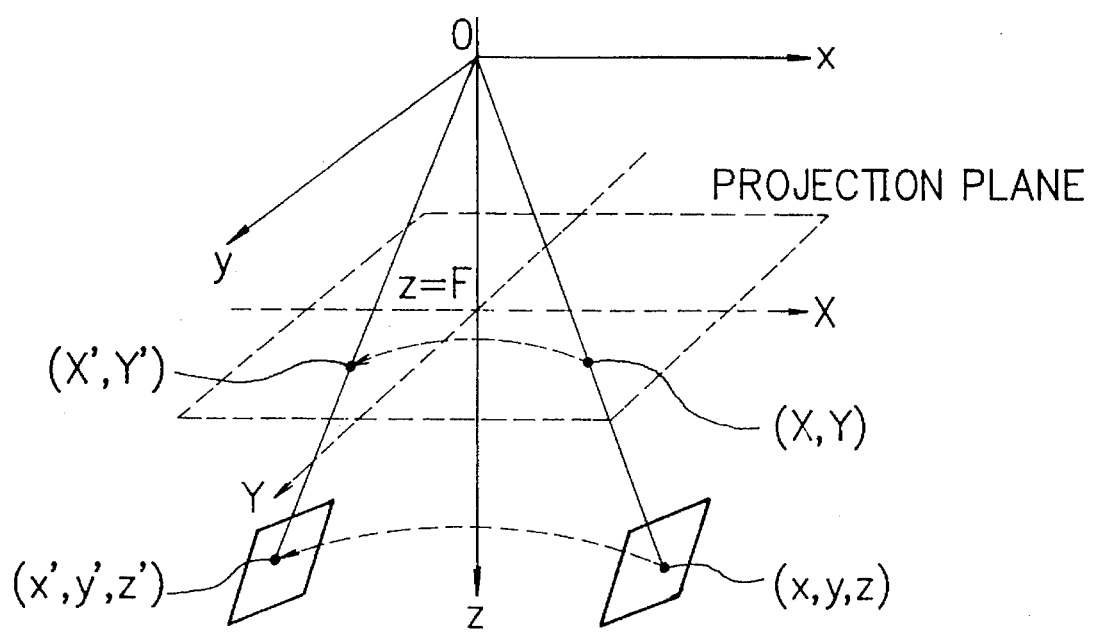
FIG. 2 is a diagram for explaining a model for motion prediction.

Finally, in the model to project points from a three-dimensional space onto a two-dimensional plane, a central projection is used as shown in FIG. 2. In this situation, the correspondence between three-dimensional coordinates (x, y, z) and two-dimensional coordinates (X,Y) is expressed as $$X=F \cdot (z/x), \quad Y=F \cdot (y/z) \tag{5}$$

According to the models expressed in equations (3) to (5), displacement of pixel positions on the projection plane due to motion $(X,Y) \rightarrow (X',Y')$ is represented as follows.

$$(X',Y') = \left( \frac{a_1X + a_2X + a_3}{a_7X + a_8Y + 1}, \frac{a_4x + a_5Y + a_6}{a_7X + a_8Y + 1} \right) \quad (6)$$

Expression (6) represents the three-dimensional motion. Using eight parameters $a_1$ to $a_8$, the motion is expressed. These eight parameters are motion parameters.

Description will now be given of a method of predicting motion parameters from a real image according to the article above.

Assume that the luminance value is changed only by displacement of the object. Approximating signal values $S(X,Y)$ on the two-dimensional plane using a quadratic expression, the parameters can be calculated from the inter-frame difference FD $(X,Y)$ and luminance gradient values $G_x$ an $G_y$ in the frame as follows.

$$\Delta \vec{a} = (H^T, H)^{-1} \cdot H^T \cdot \vec{FD} \quad (7)$$

where, $$\Delta \vec{a} = (a_1-1, a_2, a_3, a_4, a_5-1, a_6, a_7, a_8)^T \quad (8)$$

the vector $\vec{FD}$ and the matrix H are expressed by data arranged for each pixel position of the area as $$\vec{FD} = \begin{pmatrix} FD(X_1, Y_1) \\ FD(X_2, Y_2) \\ \cdot \\ \cdot \\ FD(X_N, Y_N) \end{pmatrix}, H = \begin{pmatrix} \vec{H}(X_1, Y_1) \\ \vec{H}(X_2, Y_2) \\ \cdot \\ \cdot \\ \vec{H}(X_N, Y_N) \end{pmatrix}, \text{N is the number of pixels} \quad (9)$$

where, $$FD(X,Y) = S_K(X,Y) - S_{K-1}(X,Y), K \text{ is the frame number} \quad (10)$$

$$\vec{H}(X,Y) = (G_xX, G_xY, G_x, G_yX, G_yY, G_y, X(G_xX+G_yY),$$

$$Y(G_xX+G_yY)) \quad (11)$$

$$G_X = \frac{\partial S(X,Y)}{\partial X}, G_Y = \frac{\partial S(X,Y)}{\partial Y} \quad (12)$$

The motion compensating means 106 compensates motion for each moving object area according to the motion parameters determined by the motion estimating means 105. As an example of the motion compensating method, displacement and transformation of an image are conducted using the motion parameters corresponding to each moving object area of the reference image, thereby creating a predicted image. There may be a case where some pixels are not assigned with predicted values and/or a case where a pixel is assigned with a plurality of predicted values. To cope with these cases, the predicted image is first initialized with predetermined values such that moving object areas undergoing displacement and transformation sequentially overwrite the predetermined values. As a result, pixels for which predicted values are missing are assigned with the specified initial values, and pixels assigned with a plurality of predicted values are assigned with the last written values.

Description will next be given of a sequence of processing procedures in the embodiment of the motion compensated prediction apparatus configured as above. FIGS. 3A–3E schematically show results produced by the respective processing steps.

Figure 3A:
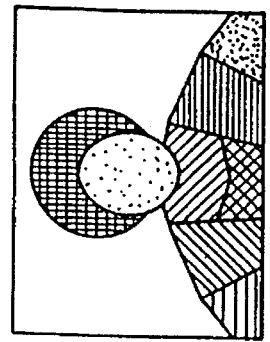
FIG. 3A is a diagram schematically showing a result of initial area segmentation attained by the reference image partitioned by the area subdividing means in accordance with the present invention.
Figure 3B:
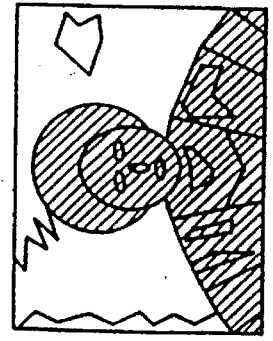
FIG. 3B is a diagram schematically showing a result after processing by the inter-frame difference calculating means which references inter-frame difference information between the input and reference signals and by the moving area detecting means which designates moving object areas on the basis of the initial segmentation result in accordance with the present invention.

1) First, the area subdividing means 101 partitions the reference image to attain a result of initial area segmentation as shown in FIG. 3A.

2) Next, the inter-frame difference calculating means 102 references inter-frame difference information between the input and reference signals and then the moving area detecting means 103 designates moving object areas on the basis of the initial segmentation result. The result obtained is indicated by oblique lines in FIG. 3B.

Figure 3C:
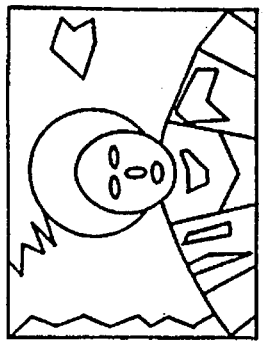
FIG. 3C is a diagram schematically showing a result of area segmentation after processing by the area integrating means which integrates similar moving object areas based on information on pixel values of the reference image in accordance with the present invention.

3) The area integrating means 104 integrates similar moving object areas based on information of pixel values of the reference image so as to complete area segmentation as shown in FIG. 3C.

Figure 3D:
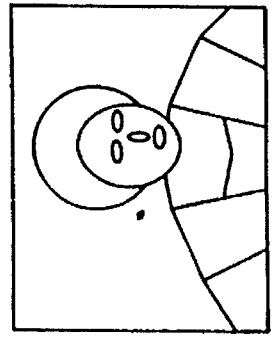
FIG. 3D is a diagram schematically showing a result of estimation produced by the motion estimating means which estimates inter-frame motion for each sub-area in accordance with the present invention.

4) The motion estimating means 105 estimates inter-frame motion for each sub-area to produce a result of estimation as shown in FIG. 3D.

Figure 3E:
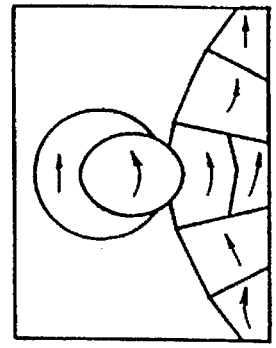
FIG. 3E is a diagram schematically showing a motion compensated prediction image obtained by the motion compensating means which compensates motion for each subdivided area of the reference image in accordance with the present invention.

5) Finally, the motion compensating means 106 compensates motion for each subdivided area of the reference image to obtain a motion compensated prediction image as indicated by FIG. 3E.

As a result of the procedures, according to the motion compensated prediction apparatus and method of the embodiments, there is attained a motion compensated prediction image with improved motion compensation.

The embodiments above are suitable examples embodying the present invention. However, the present invention is not restricted to these embodiments. The embodiments can be changed or modified without departing from the scope and spirit of the present invention. For example, for a pixel for which the predicted value is missing, the value may be calculated from values of a plurality of peripheral pixels for which the predicted values are uniquely decided. For a pixel assigned with a plurality of predicted values, a predicted value may be selected according to a predetermined reference or a predicted value may be calculated such as a mean value calculated from a plurality of values.

As can be understood from the above description, according to the primary portions of the motion compensated prediction apparatus and method of the present invention, a reference image is segmented into sub-areas on the basis of the contents of the image. By reference to information of inter-frame difference between an input image and the reference image, moving areas are detected from results of segmentation such that moving areas are integrated into moving object areas according to the reference image. For each moving object area, there is estimated inter-frame motion between the input and reference images. Based on motion parameters representing motion of the moving object areas, motion compensation is effected for each moving object area of the reference image so as to produce a motion compensated prediction image for the input image.

In accordance with the present invention as described above, areas associated with motion and having similar pixel values are extracted so that motion compensation is achieved for each of the extracted areas. This produces a complete motion compensated prediction image without block distortion. Only moving areas are extracted to be integrated and therefore the number of areas is reduced. Consequently, the number of operations and the quantity of generated code are reduced. Area integration is accomplished only between the moving areas and hence it is possible to prevent excessive integration related to static areas. Each integrated area has a sufficiently large size and thus inter-area influence becomes relatively small. This enables a high-level motion model to be implemented which improves the precision of motion estimation.

Since the motion compensated prediction image is visually natural and complete, when a means to encode prediction errors is also employed in the system, a visually acceptable image is produced with a reduced amount of code. This makes it possible to construct a moving picture encoder of a low bit rate.

While the present invention has been described with reference to the particular illustrative embodiments, it is not to be restricted to these embodiments. It is to be appreciated that those skilled in the art can change or modify the embodiments without departing from the scope and spirit of the present invention.

What is claimed is:

1. A motion compensation apparatus for inter-frame prediction comprising:

an area subdividing means for subdividing a reference image into sub-areas and producing a subdivided area, an inter-frame difference calculating means for producing inter-frame difference information between an input image and the reference image;

a moving area detecting means for detecting, by reference to the inter-frame difference information, sub-areas in said subdivided area having inter-frame difference information of a predetermined character and designating said sub-areas as moving areas;

an area integrating means for integrating the moving areas and outputting the integrated areas as moving object areas;

motion estimating means for estimating inter-frame motion between the input and reference images for each of the moving object areas and outputting motion parameters representing motion of the moving object areas; and motion compensating means for conducting motion compensation for each of the moving object areas according to the motion parameters and producing and outputting a motion compensated prediction image.

2. A motion compensation apparatus as claimed in claim 1, wherein the area subdividing means subdivides the reference image into sub-areas using at least one of a region growing method, a dividing method, a split and merge method, and a clustering method.

3. A motion compensation apparatus as claimed in claim 1, wherein the moving area detecting means checks a plurality of sub-areas and designates as moving areas sub-areas having large inter-frame differences.

4. A motion compensation apparatus as claimed in claim 1, wherein the area integrating means integrates adjacent moving areas having similar characteristics equal to or more than a predetermined value.

5. A motion compensation; apparatus as claimed in claim 1, wherein the motion estimating means establishes, by use of the moving object areas as templates, matching with respect to a current frame image and thus attains motion parameters.

6. A motion compensation apparatus as claimed in claim 1, wherein the motion compensating means initializes the motion compensated prediction image to predetermined values and overwrites the predetermined values with values corresponding to a displaced and transformed image of the moving object areas.

7. A motion compensation method of inter-frame prediction comprising the steps of:

subdividing a reference image into sub-areas and producing a subdivided area;

producing inter-frame difference information between an input image and the reference image;

detecting, by reference to the inter-frame difference information, sub-areas of the subdivided area having inter-frame difference information of a predetermined character and designating said sub-areas as moving areas;

integrating the moving areas and outputting the integrated areas as moving object areas;

estimating inter-frame motion between the input and reference images for each of the moving object areas and outputting motion parameters representing motion of the moving object areas; and conducting motion compensation for each of the moving object areas according to the motion parameters and producing and outputting a motion compensated prediction image.

8. A motion compensation method as claimed in claim 7, wherein the area subdividing step subdivides the reference image into, sub-areas using at least one of a region growing method, a dividing method, a split and merge method, method, and a clustering method.

9. A motion compensation method as claimed in claim 7, wherein the moving area detecting step checks a plurality of sub-areas and designates as moving areas sub-areas having large inter-frame differences.

10. A motion compensation method as claimed in claim 7, wherein the area integrating step integrates adjacent moving areas having similar characteristics equal to or more than a predetermined value.

11. A motion compensation method as claimed in claim 7, wherein the motion estimating step establishes, by use of the mobile object areas as templates, matching with respect to a current frame image and thus attains motion parameters.

12. A motion compensation method as claimed in claim 7, wherein the motion compensating step initializes the motion compensation estimated image to predetermined values and overwrites the predetermined values with values corresponding to a displaced and transformed image of the moving object areas.

* * * * *